(12) United States Patent
Le

(10) Patent No.: US 7,452,465 B2
(45) Date of Patent: Nov. 18, 2008

(54) INCUBATION TREATMENT OF SLUDGE FOR PATHOGEN REDUCTION PRIOR TO DIGESTION

(75) Inventor: Son Le, Cheshire (GB)

(73) Assignee: United Utilities PLC, Cheshire (GB)

( * ) Notice: Subject to any disclaimer, the term of this patent is extended or adjusted under 35 U.S.C. 154(b) by 67 days.

(21) Appl. No.: 10/494,985

(22) PCT Filed: Sep. 18, 2002

(86) PCT No.: PCT/GB02/04284

§ 371 (c)(1),
(2), (4) Date: Nov. 3, 2004

(87) PCT Pub. No.: WO03/040047

PCT Pub. Date: May 15, 2003

(65) Prior Publication Data

US 2005/0077236 A1    Apr. 14, 2005

(30) Foreign Application Priority Data

Nov. 9, 2001    (GB) ................... 0126963.8

(51) Int. Cl.
C02F 11/04 (2006.01)
C02F 3/28 (2006.01)
(52) U.S. Cl. ............ 210/603; 210/613; 435/262.5
(58) Field of Classification Search ............ 210/603, 210/612, 613, 175, 252, 259; 435/262, 262.5
See application file for complete search history.

(56) References Cited

U.S. PATENT DOCUMENTS

| 2,198,737 | A | * | 4/1940 | Petersen | 210/603 |
|---|---|---|---|---|---|
| 2,315,577 | A | * | 4/1943 | Bach | 210/613 |
| 4,022,665 | A | | 5/1977 | Ghosh et al. | |
| 4,214,985 | A | * | 7/1980 | Bodenrader | 210/611 |
| 4,372,856 | A | * | 2/1983 | Morrison | 210/603 |
| 4,429,043 | A | * | 1/1984 | Paton | 435/167 |
| 4,503,154 | A | * | 3/1985 | Paton | 435/167 |
| 4,983,298 | A | | 1/1991 | Fuchs et al. | |
| 5,725,770 | A | | 3/1998 | Henry | |
| 6,077,548 | A | * | 6/2000 | Lasseur et al. | 426/7 |
| 6,214,228 | B1 | * | 4/2001 | Jones et al. | 210/603 |
| 6,325,935 | B1 | * | 12/2001 | Hojsgaard | 210/609 |
| 6,755,972 | B1 | * | 6/2004 | Kouloumbis | 210/602 |
| 6,929,744 | B2 | * | 8/2005 | Le | 210/603 |
| 2004/0011718 | A1 | * | 1/2004 | Arnett et al. | 210/175 |

(Continued)

FOREIGN PATENT DOCUMENTS

DE    32 48 703    7/1984

(Continued)

*Primary Examiner*—Fred Prince
(74) *Attorney, Agent, or Firm*—Michael Best & Friedrich LLP

(57) ABSTRACT

A method of treating sewage sludge comprises a pathogen reduction stage in which raw sludge is incubated for a predetermined incubation period at a temperature in the mesophilic temperature range. The sludge is incubated in a plurality of sequential vessels (1a,1b,1c) comprising an upstream vessel (1a) which receives the raw sludge to be incubated and a downstream vessel (1c) which discharges the incubated sludge. The sludge is fed from the upstream vessel (1a) to the downstream vessel (1c), via any intermediate vessels (1b), and subsequently discharged after spending a predetermined residence time in each vessel, the total residence time being said predetermined incubation period.

14 Claims, 1 Drawing Sheet

U.S. PATENT DOCUMENTS

2004/0025715 A1 * 2/2004 Bonde et al. .................. 99/485

FOREIGN PATENT DOCUMENTS

| DE | 3248703 | * | 7/1984 |
|----|---------|---|--------|
| DE | 40 00 834 | | 8/1990 |
| DE | 4000834 | * | 8/1990 |
| DE | 3905228 | | 10/1990 |
| EP | 0 203 467 | | 12/1986 |
| JP | 05-123693 | | 5/1993 |
| WO | 95/25071 | | 9/1995 |
| WO | WO 01/85627 | | 11/2001 |

* cited by examiner

INCUBATION TREATMENT OF SLUDGE FOR PATHOGEN REDUCTION PRIOR TO DIGESTION

The present invention relates to a method and apparatus for the treatment of sewage sludge.

Sewage sludge is widely used in the agricultural industry as a source of fertiliser and soil conditioner. To render raw sewage sludge suitable for such use, it must first be treated both to reduce the organic content to stabilise the sludge and also to reduce the pathogen content.

A well known traditional sewage sludge treatment process is mesophilic anaerobic digestion (MAD) which reduces the organic content of sewage sludge by conversion to methane through the actions of micro-organisms. In practical processes small volumes of raw sludge are fed to a reactor vessel containing a much larger volume of digested sludge (within which the necessary ecology has been established and is maintained) displacing a similarly small volume of digested sludge in the process. This may either be a continuous process or a batch process, but whichever method is operated the amount of raw sludge introduced to the reactor has to be relatively small in comparison to the volume of the reactor to ensure that the necessary conditions for the ongoing digestion are maintained. Raw sewage sludge introduced into the reactor is thoroughly mixed and the average time any particular volume of sludge spends in the reactor is referred to as the retention time.

The processes which occur in a traditional MAD process are well documented. Essentially the digestion process is considered to involve three steps: a first step of solubilisation of solids by hydrolytic enzymes; a second step of bacterial synthesis of fatty acids (acidogenesis by acidogens); and finally a third step of gasification by the methane bacteria (methanogenesis by methanogens). A temperature of $30°$-$35°$ C. provides the best rate of conversion and stability with a typical retention time of at least 12 days and typically of the order of 18-20 days.

It has in the past been considered that sufficient sludge stabilisation and pathogen reduction could be achieved by treating the sludge in a MAD process comprising a primary digestion stage carried out in a stirred reactor for a retention period of at least twelve days at a temperature of approximately $35°$ C. followed by a secondary digestion in an unstirred tank for a further period of at least fourteen days. However, in more recent times, particularly in the wake of increasing concern over well publicised problems relating to sewage-borne diseases such as BSE and *E.coli*, the level of pathogen reduction that can be achieved in such MAD processes alone is no longer considered sufficient to meet health requirements.

Commercial disinfection processes are known which can produce levels of pathogen reduction sufficient to meet the increasingly stringent requirements. In general, such processes rely on high temperatures to pasteurise the sludge and thereby effect pathogen deactivation. Typical processes require holding the sludge at a minimum temperature of around $55°$ C. for at least twenty four hours. More usually, commercial processes operate at a higher temperature to reduce the required time. For instance, there are commercial systems which operate at $65°$ C. for one hour or $72°$ C. for thirty minutes. As mentioned above the minimum temperature required for the de-naturation of proteins and DNA considered necessary for effective pathogen reduction is $55°$ C.

As a result of the above, conventional methods currently employed for the treatment of sludge comprise two stages: a first pasteurisation stage to reduce pathogen content and a second stabilisation stage to reduce organic content. The most widely used method of sewage sludge treatment which has been operating for a number of years is such a dual stage process in which the first stage comprises thermophilic aerobic digestion (TAD) and the second stage comprises MAD process. The initial TAD stage relies on a combination of thermophilic aerobic digestion and hot water to establish the temperature necessary to produce the required levels of pathogen reduction. Details of this type of system, and the nature of the reactions occurring, are well known and well documented.

Two stage sludge treatment processes requiring a first thermal disinfection stage inevitably require a substantial investment in reactor vessels, mixing/aeration devices and heat delivery systems. It is therefore relatively expensive to establish such processes and also expensive to provide the necessary power and heat to maintain their operation.

As mentioned above conventional MAD processes alone provide very poor disinfection. The degree of pathogen reduction is normally measured on a log scale, a log 1 reduction being a tenfold reduction, a log 2 reduction being a hundred fold reduction etc. Sludge digested in a conventional MAD reactor typically shows a log reduction of the order of 1.5. Given the relatively low temperature at which MAD processes operate (i.e. the mesophilic temperature range of 25 to $45°$ C. which is well below the $55°$ C. minimum temperature generally considered necessary for thermal dissinfection) what little pathogen reduction does occur is assumed to be a result of natural dying off processes. It has also been noted that the degree of pathogen reduction in a conventional MAD process can be quite variable, typically varying between a log reduction of 0 and a log reduction of 3. This variation is assumed to be a result of variations in the effectiveness of the mixing operations taking place in the MAD reactor and even the bypass of raw sewage sludge directly from the reactor inlet to the reactor outlet.

The present inventor has however previously established that very good levels of pathogen reduction, much higher than those achieved in conventional MAD processes, can be achieved at mesophilic temperatures by incubating raw sludge rather than the partially digested sludge which is maintained in a conventional MAD reactor. On this basis the present inventor has previously proposed a microbial incubation process which may be used to disinfect sludge prior to conventional digestion and which has achieved a log reduction in pathogen content much greater than log 3.

The incubation period may be varied, for instance depending on the required level of pathogen reduction. Very good pathogen reduction levels have been achieved with incubation periods down to about twelve hours. A typical incubation period would however be between 1 and 4 days, it being unlikely that it would be necessary to incubate for more than seven days to achieve good pathogen reduction.

Clearly the temperature alone is not responsible directly for the deactivation of pathogens since the same temperature is used in conventional MAD reactors and is well below the accepted minimum of $55°$ C. required for thermal dissinfection. Moreover, $37°$ C., which is one possible operating temperature of the process, is the ideal growing temperature for pathogens such as *E.coli*.

Further consideration of the digestion processes occurring in sludge at mesophilic temperatures has led the inventor to the belief that the pathogen deactivation is a direct result of the action of enzymes secreted by spoilage bacteria, otherwise known as hydrolytic bacteria, which is naturally present in the sludge and which is responsible for the initial solubilisation of organic solids in the sewage sludge. Typically, hydrolytic bacteria population can double in a matter of hours. On the other hand, the acidogens which rely on the hydrolytic products for their growth can double their population in a matter of days. Likewise, methanogens which rely on the acidogenesis products for their growth have even slower doubling rates. Because of the very fast growth rates of the hydrolytic bacteria, it is quite practical to achieve full hydrolysis thereby achieving pathogen destruction by the incubation process. By contrast, acidogenesis (Ghosh, U.S. Pat. No. 4,022,665) and methanogensis must rely on an established ecology to achieve good conversion in a reasonable time period to be practical. It is thought that amongst the host of enzymes secreted by the hydrolytic bacteria to break down the different food groups are enzymes which destroy the pathogens such as E.coli. The evidence for this is the observation that typically more than 90% of the pathogen numbers is destroyed during the first 24 hours of the incubation process. The details of the process are not yet fully understood and the inventor does not therefore wish to be bound by the current understanding as set out above and discussed further below. Nevertheless, this does offer an explanation as to why good pathogen reduction occurs in the MIP processes of the present invention but no significant pathogen reduction occurs in conventional MAD processes.

In particular, the process was designed to optimise the conditions for establishing a high population of the hydrolytic bacteria. A significant factor contributing to this is the availability of organic matter on which the hydrolytic bacteria primarily feeds. With the present invention the incubation of raw sludge ensures a high organic content which promotes the growth of the hydrolytic bacteria and thus the consequent reduction in pathogen content. With conventional MAD processes, however, the reactor contains a high proportion of digested sludge (necessary to maintain the ecology required for good methane production) so that the overall organic content of the reactor is low. This depletion of the available food source for the hydrolytic bacteria limits growth of the hydrolytic bacteria which therefore has no significant effect on the pathogen content. Although conventional MAD reactors are fed with raw sludge (i.e. sludge with a high organic content) this takes place in relatively small amounts (relative to the size of the reactor), either in batches or continuously, and the food source present in the raw sludge is mixed and therefore diluted in the digested sludge. Thus, the traditional feed regime for conventional MAD reactors is currently considered largely responsible for the poor pathogen reduction performance.

Another factor which is considered to contribute to the effective pathogen reduction of the microbial incubation process is that the raw sludge is initially at a relatively low pH of around pH 5 to pH 6.5. The hydrolytic bacteria is particularly active at these pH ranges. In a conventional MAD reactor the pH will be higher (of the order of pH 7 to pH 8) as a result of ammonia production. The pH of the raw sludge treated in accordance with the present invention will increase as a result of the incubation process but nevertheless high levels of pathogen reduction are achievable.

Two practical implementations of the microbial incubation system have previously been proposed by the inventor. In each case the incubation is carried out in a reactor vessel (incubator) upstream of a conventional MAD digester. In one implementation batches of raw sludge are incubated and delivered to the MAD digester as a whole. In this case, it has been proposed to provide several reactors feeding the digester at staggered intervals so that the frequency of supply of sludge to the digester can be greater than the required incubation period thus enabling the preferred digester feed regime to be maintained. A disadvantage with this approach is the need to provide separate raw sludge supply paths to each of the reactor vessels, and the means for heating the raw sludge to the mesophilic temperature within each of the vessels. Accordingly, in a second preferred scheme previously proposed by the inventor the raw sludge is incubated in a "plugflow" reactor. In a plugflow reactor there is a continuous input/output to/from the reactor without any mixing occurring within the reactor. The aim is for all material passing through the reactor to have the same residence time within the reactor. Thus, in principal a plugflow reactor can provide a continuous feed to a downstream digester from a single reactor vessel, obviating the problems associated with the use of a plurality of batch reactors each feeding the downstream digester. In practice, this ideal has proved difficult to achieve because of the viscous nature of the sludge which does not therefore behave as an ideal fluid, rather tending to stick to surfaces of the reactor vessel producing uneven flow patterns. It has thus proved difficult to provide incubation in a plug flow reactor with consistent pathogen reduction performance without providing a plug flow reactor which is several times larger than the ideal design in order to guarantee the required minimum sludge retention time.

It is an object of the present invention to obviate or mitigate the above disadvantages.

SUMMARY OF THE INVENTION

According to a first aspect of the present invention there is provided a method of treating sewage sludge comprising a pathogen reduction stage in which raw sludge is incubated for a predetermined incubation period at a temperature in the mesophilic temperature range, wherein the sludge is incubated in a plurality of sequential vessels comprising an upstream vessel which receives the raw sludge to be incubated and a downstream vessel which discharges the incubated sludge, the sludge being fed from the upstream vessel to the downstream vessel, via any intermediate vessels, and subsequently discharged after spending a predetermined residence time in each vessel, the total residence time being said predetermined incubation period.

According to a second aspect of the present invention there is provided apparatus for treating sewage sludge comprising a plurality of sludge incubation vessels for incubating raw sewage sludge at a temperature within the mesophilic temperature range for a predetermined incubation period, including an upstream vessel for receiving raw sludge and a downstream vessel for discharging incubated sludge, means for heating the sludge and maintaining it at with said range temperature whilst resident within the incubation vessels, and means for transferring the sludge sequentially from said upstream vessel to said downstream vessel via any intermediate vessels, the sum of the residence times of each portion of sludge in each vessel being said pre-determined incubation period.

The mesophilic temperature range is understood to be from about 25° C. to about 46° C. Although as is discussed further below temperature is not believed to be the direct cause of the pathogen reduction it can have an effect on the rate of pathogen reduction and in the present invention the preferred operating temperature range is between 32° C. and 42° C.

It will be understood that whereas the term "raw" sewage sludge normally refers to a sludge stream resulting directly from a sludge treatment process the present invention can be used to treat any sludge stream containing harmful pathogens such as farmyard slurries, abattoir wastes and wastes from other industrial processes. Moreover, the term "raw" is used to refer to a sludge which has a relatively high organic content and does not exclude the possibility that there has been some degree of pre-treatment on the sludge.

Preferably said upstream vessel, and only said upstream vessel, is heated to raise the temperature of the raw sludge to a temperature in the mesophilic temperature range. The or each vessel downstream of said upstream vessel may if necessary be thermally insulated to maintain the sludge at a temperature in the mesophilic temperature range. There is thus no need to heat each of the incubator vessels.

Preferably there are at least three sequential vessels, including said upstream and downstream vessels and at least one intermediate vessel. Utilising a greater number of smaller vessels reduces the size of pump required to transfer sludge from one vessel to the next and may reduce pumping times and overall incubator volume.

The sludge is preferably agitated for at least a portion of its residence time in each of the vessels, for instance by the supply of pressurised gas (e.g. biogas) to the respective vessel through an appropriate gas mixing nozzle or the like.

In one embodiment each vessel is at least partially emptied of sludge which has been held within that vessel for the respective retention time before being filled with further sludge. In another embodiment sludge is continuously transferred in sequence from said upstream vessel to said downstream vessel via any intermediate vessels.

The incubation vessels are preferably maintained under an anaerobic condition.

The sludge treatment process may comprise further treatment stages upstream or downstream of the pathogen reduction stage. For instance the process may include a digestion stage (e.g. mesophilic anaerobic digestion) downstream of the pathogen reduction stage, incubated sludge discharged from said downstream vessel being fed directly to said digestion stage. The process according to the present invention can thus be used to reduce the pathogen content of sludge which is subsequently treated by a conventional MAD process to stabilise the organic content. In this case only the primary MAD stage is required and the secondary digestion mentioned above is obviated. The hydrolytic bacteria will not itself be a problem as it will naturally die off particularly in the high pH conditions and the lack of food in the MAD reactor.

Thus the term "raw" should be interpreted broadly as referring to sewage sludge having a high organic content. Typically this will be sludge having a total Chemical Oxygen Demand (COD) greater than about 10,000 mg/l, although in practical applications the sludge of interest is likely to have a COD in the range 30,000 to 500,000 mg/l and a BOD (5 day) in the range 8,000 to 250,000 mg/l (the BOD indicating the biodegradability of the sludge).

BRIEF DESCRIPTION OF THE DRAWING

Specific embodiments of the present invention will now be described, by way of example only, with reference to the accompanying drawing, which is a schematic illustration of a sludge treatment system in accordance with the present invention.

DETAILED DESCRIPTION OF THE INVENTION

Figure 1:
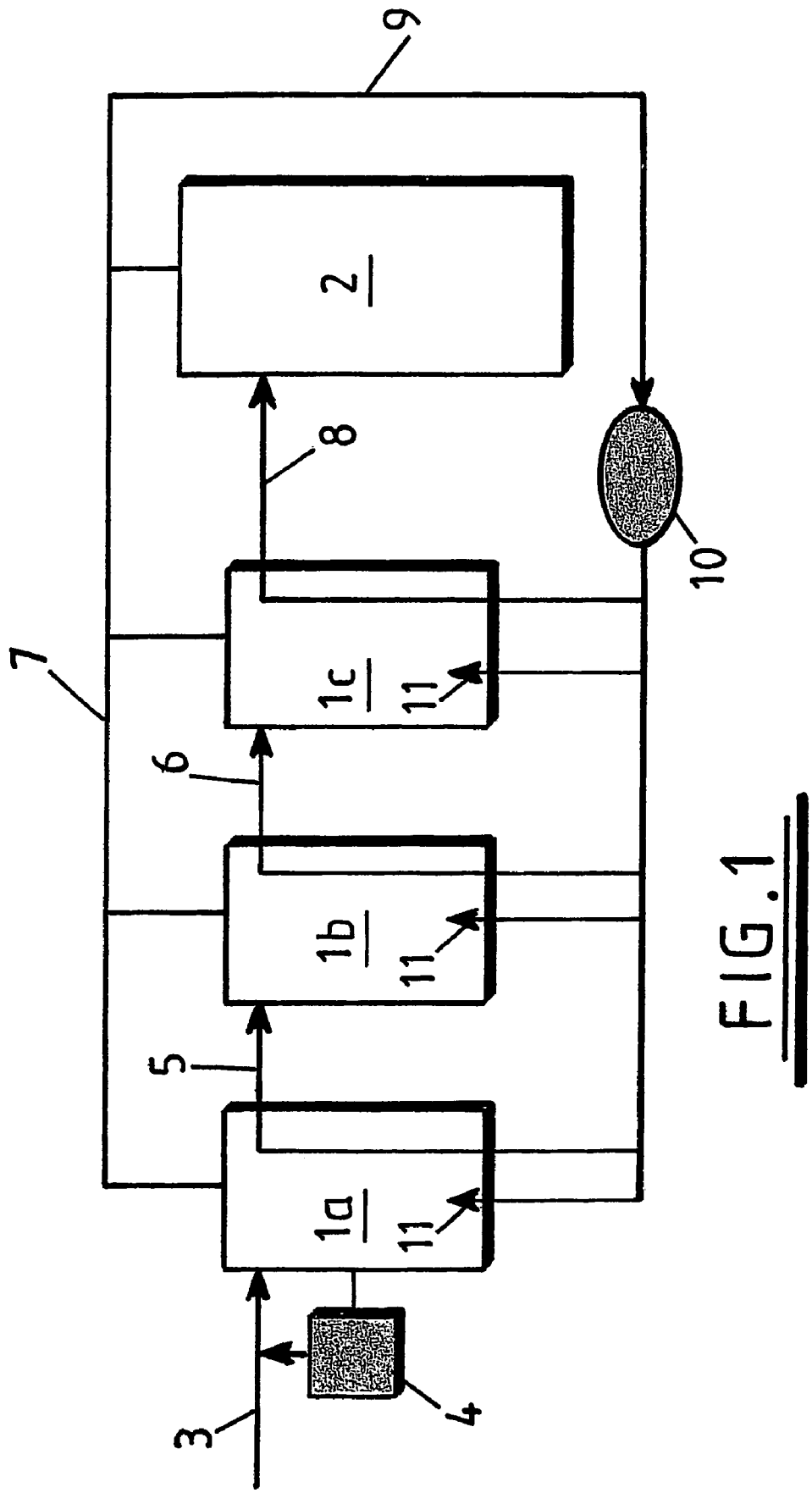

Referring to the drawing, the schematically illustrated apparatus comprises a sludge treatment system of sequential incubators (in this case three) designated 1a, 1b and 1c which feed sludge to a downstream mesophilic anaerobic digester 2. A raw sludge feed line 3 is provided to deliver raw sludge to the upstream incubator 1a. A suitable heating means 4 is provided to heat the sludge within incubator vessel 1a to a temperature within the mesophilic temperature range. Sludge transfer lines 5 and 6 are provided between incubators 1a and 1b, and 1b and 1c respectively. Biogas generated by incubation within the vessels 1a to 1c is drawn off and fed to the head space of the downstream anaerobic digester 2 via gas lines 7. Gas lift pumps (not shown) are used to transfer sludge between the incubators and from the incubators to the digester via digester input line 8 using biogas which is drawn off from the digester via line 9 and pressurised by compressor 10. Each incubator vessel 1a to 1c is fitted with a gas mixing nozzle 11 which receives pressurised biogas from compressor 10 and injects this into the sludge within the respective incubator to agitate and thereby thoroughly mix the sludge within the incubator vessel.

In use, the sludge may be transferred by the incubators to the digester continuously or in batches. In batch mode for instance, incubated sludge from downstream reactor 1c is emptied into the digester 2 at periodic intervals, following which partially incubated sludge is transferred to downstream incubator 1c from intermediate incubator 1b and from upstream incubator 1a to intermediate incubator 1b respectively. Raw sludge is then fed to upstream incubator 1a. With appropriate sized vessels and pumping means, individual incubator vessels can be emptied and re-filled relatively quickly so that for practical purposes, emptying of downstream vessel 1c can be considered to occur at the same time as re-filling of upstream vessel 1a having regard to the relatively short pumping time compared to the retention time of each vessel. It will be appreciated that the total sludge retention time within each of the incubator vessels 1a to 1c is the overall incubation period, which may typically be between 0.5 and 5 days.

When operated continuously, the rate of flow of sludge through the incubators can be controlled to provide the required overall incubation period, and also to allow for effective mixing of sludge within each incubator so there is little chance of raw sludge being transferred from one incubator vessel to the next. Overall, given the mixing that occurs in each vessel sequentially there is virtually no possibility of raw sludge being transferred to the digester 8.

As a modification of the batch mode of operation, only a portion of the volume of each incubator vessel may be replaced in any one discharge/refill operation.

By way of example, a sludge incubation system essentially as illustrated in FIG. 1, but comprising six incubator vessels rather than three, was used for treatment of raw sewage sludge. Each incubator vessel had a working volume of 83 $m^3$ and the downstream digester had a working volume of 3000 $m^3$. The sludge transfer from each incubator vessel was operated in a batch sequence, every twelve hours each incubator being emptied and re-filled with sludge in the sequence described above. The raw sludge was heated to a temperature of 45° C. in the upstream incubator vessel, the intermediate and downstream incubator vessels being thermally insulated to maintain the temperature in the mesophilic range (although the temperature dropped to about 42° C. before introduction to the digester).

Measurements of pathogen level showed that on average the E.coli content in the sludge transferred to the digester was 1,200 times less than that present in the raw sludge delivered to the upstream incubator vessel. Thus, on average the treatment process reduces the pathogen level by a factor of 3.08 overall on a log scale.

It should also be noted that the total volume of the incubator vessels in this example is only 16.6% of the digester volume.

In a second example the sludge incubation system used for the first example was operated with a six hour sludge transfer sequence, with only half of the volume of each incubator vessel being replaced during each transfer. This was found to be less effective in reducing pathogen content than the first example, but nevertheless provided good results giving 900 fold decrease in pathogen level so that on average the process reduces the pathogen level by a factor of 2.95 overall on a log scale.

By way of comparison, a sludge treatment experiment was conducted using three incubated vessels each receiving a direct supply of raw sludge, and each delivering incubator sludge directly to a downstream digester. Each incubator vessel had a volume 100 m$^3$, with the digester volume being 600 m$^3$. The system was operated on a three day cycle, during any cycle one of the reactors receiving raw sludge at a rate of 33.3 m$^3$ per day, another incubating sludge 42° C., and a third feeding incubator sludge to the digester at a rate of 33.3 m$^3$ per day. It was found that on average the pathogen level, as measured by the *E.coli* content, was reduced by 1250 times giving an average pathogen reduction level of 3.10 overall on a log scale. This demonstrates that the advantages of the present invention are achieved without any real loss of pathogen reduction performance. A further disadvantage of this prior art system is that the overall incubator volume is 50% of the digester volume.

It will be appreciated that many modifications and enhancements may be made to the basic treatment system outlined schematically in FIG. 1. For instance, methods of pumping sludge from one vessel to the next, and of agitating sludge within each vessel may be varied. The total number of incubator vessels can vary to suite any particular application, as can the relative size of the incubator vessels to the size of the downstream digester. The downstream digester need not necessarily be a mesophilic anaerobic digester but could be any appropriate digester or further treatment stage. The biogas which is drawn off from each incubator vessel is conveniently fed to the digester but could be fed to a separate holding tank. Although it is only necessary to heat the upstream incubator vessel particularly if the downstream vessels are thermally insulated, it may nevertheless be preferable to provide some degree of heating to all incubator vessels.

Other possible modifications will be readily apparent to the appropriately skilled person.

The invention claimed is:

1. A two stage sludge treatment process comprising:
   a first pathogen reduction stage in which raw sludge is incubated for a predetermined incubation period at a temperature in the mesophilic temperature range of about 25° C. to about 46° C.; wherein the total chemical oxygen demand (COD) of the raw sludge is greater than about 10,000 mg/l and wherein the raw sludge is incubated in a plurality of sequential vessels comprising an upstream vessel which receives the raw sludge to be incubated and a downstream vessel which discharges the incubated sludge, the sludge being fed from the upstream vessel to the downstream vessel, via any intermediate vessels, to provide a total residence time of between 0.5 and 5 days and subsequently being fed to a suitable reactor for mesophilic anaerobic digestion of the sludge after spending a predetermined residence time in each vessel, the total residence time being said predetermined incubation period.

2. A method according to claim 1, wherein said upstream vessel, and only said upstream vessel, is heated to raise the temperature of the raw sludge to a temperature in the mesophilic temperature range.

3. A method according to claim 2, wherein the or each vessel downstream of said upstream vessel is thermally insulated to maintain the sludge at a temperature in the mesophilic temperature range.

4. A method according to claim 1, wherein there are at least three sequential vessels, including said upstream and downstream vessels and at least one intermediate vessel.

5. A method according to claim 1, wherein sludge is agitated for at least a portion of its residence time in each of the vessels.

6. A method according to claim 5, wherein the sludge is agitated by the supply of pressurised gas to the respective vessel through an appropriate gas mixing nozzle or the like.

7. A method according to claim 6, wherein said pressurised gas is biogas generated by the sludge treatment process.

8. A method according to claim 1, wherein the sludge is transferred from one vessel to the next, and discharged from said downstream vessel, using gas lift pumps powered by a pressurised gas.

9. A method according to claim 8, wherein said pressurised gas is biogas generated by the sludge treatment process.

10. A method according to claim 1, wherein each vessel is at least partially emptied of sludge which has been held within that vessel for the respective retention time before being filled with further sludge.

11. A method according to claim 1, wherein each vessel is completely emptied of sludge which has been held within that vessel for the respective retention time before being filled with further sludge.

12. A method according to claim 1, wherein sludge is continuously transferred in sequence from said upstream vessel to said downstream vessel via any intermediate vessels.

13. A method according to claim 1, wherein the vessels are maintained under an anaerobic condition.

14. A method according to claim 1, wherein biogas is drawn off from the incubation vessels and supplied to the mesophilic anaerobic digester or to a separate gas holding vessel.

* * * * *